United States Patent
Wu et al.

(10) Patent No.: US 6,437,210 B1
(45) Date of Patent: Aug. 20, 2002

(54) MAZZITE SUPPORTED CATALYST

(75) Inventors: An-hsiang Wu, Bartlesville; Charles A. Drake, Nowata, both of OK (US)

(73) Assignee: Phillips Petroleum Company, Bartlesville, OK (US)

( * ) Notice: Subject to any disclaimer, the term of this patent is extended or adjusted under 35 U.S.C. 154(b) by 156 days.

(21) Appl. No.: 09/631,556

(22) Filed: Aug. 3, 2000

Related U.S. Application Data

(62) Division of application No. 09/090,719, filed on Jun. 4, 1998, now Pat. No. 6,124,228.

(51) Int. Cl.$^7$ .............................................. C07C 5/333
(52) U.S. Cl. ........................ 585/663; 585/661; 585/662; 585/906
(58) Field of Search ................................ 585/662, 663, 585/661, 906

(56) References Cited

U.S. PATENT DOCUMENTS

| | | | |
|---|---|---|---|
| 3,853,747 A | * 12/1974 | Young | 208/111.1 |
| 5,451,391 A | * 9/1995 | Di Renzo et al. | 208/111.15 |
| 6,124,228 A | * 9/2000 | Wu et al. | 502/60 |

* cited by examiner

*Primary Examiner*—Thuan D. Dang
(74) *Attorney, Agent, or Firm*—Charles W. Stewart

(57) ABSTRACT

A catalyst, method for preparing the catalyst, and method for using the catalyst having improved conversion and/or selectivity in the dehydrogenation of hydrocarbons. The catalyst being prepared by modifying and impregnating a mazzite zeolite. Modification of the original mazzite zeolite may include steps for ion-exchanging, dealuminating, physically mixing with chromic oxide, shaping, and calcining. Once modified, the mazzite zeolite may be impregnated with at least one metal selected from the group consisting of chromium, molybdenum, tungsten and oxides of these metals.

12 Claims, No Drawings

MAZZITE SUPPORTED CATALYST

This application is a division of application Ser. No. 09/090,719, filed Jun. 4, 1998, now U.S. Pat. No. 6,124,228.

BACKGROUND OF THE INVENTION

This invention relates to catalysts for use in hydrocarbon conversion, specifically to a modified mazzite supported catalyst impregnated with at least one metal selected from the group consisting of chromium, molybdenum, tungsten and oxides of these metals which can be used for the dehydrogenation of hydrocarbons.

Hydrocarbon conversion is especially important in the petroleum industry. In recent years, an increasingly competitive market for gasoline has developed, and profit margins on gasoline sales have steadily declined. As a result, there has been considerable interest among petroleum companies in developing processes for chemically converting gasoline into various compounds of higher economic value.

A Gasoline Conversion Unit (GCU) is a system which converts gasoline into olefins and aromatics of higher economic value such as ethylene, propylene, butene, benzene, toluene, and xylene. Propane is a major by-product from the original GCU process; however, propane from a GCU is a paraffin of low value. It is, therefore, desirable to convert the propane from the original GCU process into a more valuable olefin such as propylene.

Numerous catalytic processes for dehydrogenating propane into propylene are known today, however many of the existing techniques are ineffective under the conditions of a GCU. The majority of catalysts which are currently used for the dehydrogenation of hydrocarbons are supported noble-metal catalyst. It is well known that supported noble-metal catalyst are vulnerable to sulfur poisoning which results in irreversible catalytic deactivation. Because of the original gasoline feedstream, it is inevitable that the propane produced by the GCU process will contain a considerable amount of sulfur. Therefore, a supported noble-metal dehydrogenation catalyst, when used under GCU conditions, is likely to be ineffective because it will undergo catalytic deactivation due to sulfur poisoning.

In addition, many existing catalytic processes for dehydrogenation require the presence of steam as a diluent in the feedstream. This requirement for steam makes existing dehydrogenation processes very utility intensive and, thus, very expensive.

SUMMARY OF THE INVENTION

It is, therefore, an object of the present invention to provide a catalyst and catalytic process for the dehydrogenation of paraffins to olefins which has equal or superior conversion and selectivity to prior processes and is less vulnerable to sulfur poisoning.

It is a further object of the present invention to provide a method for creating such a catalyst to be used in the dehydrogenation of paraffins to olefins.

The above objects are realized by making and using a catalyst comprising a modified mazzite zeolite impregnated with a metal from the group consisting of chromium, molybdenum, tungsten and oxides of these metals.

Prior to impregnation, the original mazzite zeolite is modified by a process comprising: performing an ion-exchange between the original mazzite zeolite and an aqueous solution of an ammonium salt, such that the alkali metal content of the original mazzite zeolite is reduced to less than 0.15% by weight; dealuminating the ion-exchanged mazzite zeolite by acid leaching with an organic acid; physically mixing the ion-exchanged and dealuminated mazzite zeolite with an inorganic binder and a peptizing agent to create a mixture which contains chromic oxide (in a preferred embodiment, chromic oxide is physically mixed with the other components) and is of a consistency and texture suitable for shaping by extrusion, pelletizing, tableting or other suitable means; shaping the mazzite zeolite mixture into extrudate, pellets, tablets or other suitable form; and calcining the shaped mazzite zeolite.

The process for impregnation of the modified mazzite zeolite with a metal from the group consisting of chromium, molybdenum, and tungsten or oxides of these metals comprises: contacting the entire outer surface of the modified mazzite zeolite with an aqueous solution containing a precursor of at least one metal from the group consisting of chromium, molybdenum, tungsten, oxides of these metals and mixtures of these metals and metal oxides; and calcining the impregnated modified mazzite zeolite.

The process for dehydrogenating hydrocarbons comprises contacting a mazzite zeolite catalyst, modified and impregnated according to the above process, using any suitable method known in the art, with a paraffin-containing feedstock under conditions effective to dehydrogenate the paraffins.

DETAILED DESCRIPTION OF THE INVENTION

The components used in the above-described catalyst preparation and the above processes will now be described in more detail. Except where otherwise indicated, the weight percentage given for each component is based upon the total weight of the components.

The starting zeolite used to prepare the novel composition of the present invention can be any zeolite from the family of synthetic mazzite zeolites.

The general formula of the synthetic zeolites of mazzite type in their form as synthesized can be written in terms of moles of oxides:

$$1 \pm 20.5(M^{2/n}O + A^{2/m}O);Al_2O_3;3-20SiO_2;0-20H_2O$$

where M is an n-valent cation, in general sodium, and A is an organic reagent carrying m positive charges. Generally, the molar ratio of $SiO_2$ to $Al_2O_3$ in the crystalline framework of the mazzite zeolite is at least about 2:1 and can range up to 250:1. Preferably the molar ratio of $SiO_2$ to $Al_2O_3$ in the zeolitic framework is about 3:1 to about 100:1.

Preferred mazzite zeolites include Zeolite Omega (Ω) and ZSM-4. The synthesis of the Zeolite Omega is described in U.S. Pat. No. 4,241,036 (Union Carbide). The synthesis of ZSM-4 is described in French Patent 2,074,007 (Mobil Oil) and British Patent 1,297,256 (Mobil Oil). The presently more preferred mazzite zeolite is Zeolite Omega.

A preferred embodiment of the present invention involves modifying a commercially available mazzite zeolite and impregnating the modified mazzite zeolite with at least one metal from the group consisting of chromium, molybdenum, and tungsten or oxides of these metals. The resulting composition is a superior catalyst for the dehydrogenation of hydrocarbons.

The first step in modifying the original mazzite zeolite is to decrease its alkali-metal content. The alkali-metal cations are removed by performing at least one, and preferably two or more, ion (cation) exchanges. A preferred method of performing such an ion exchange is to mix a mazzite zeolite powder with a solution of ionizable ammonium salt (nitrate, sulfate, chloride, etc . . . ) of molarity ranging from 0.1 up to saturation, preferably from 0.5 to 10. The mixture may then be continuously stirred for a period ranging from 0.5 hour to 48 hours, preferably from 8 hours to 24 hours, at a temperature ranging from 1° C. to 500° C., preferably from 50° C. to 150° C. The ion-exchanged zeolitic product may be decanted, washed with water, and dried in air at a temperature ranging from 60° C. to 300° C., preferably from 100° C. and 200° C., for a period ranging from 4 hours to 48 hours, preferably from 8 hours to 24 hours. The resulting ion-exchanged mazzite zeolite should contain less than 0.5% by weight of alkali metals, preferably less than 0.15% by weight of alkali metals.

The mazzite zeolite is dealuminated by acid leaching in order to create a more stable and effective zeolitic framework. A preferred method for dealumination is to mix the mazzite zeolite with an solution of an acid of molarity ranging from 0.1 up to saturation, preferably from 0.5 to 2. The acid can be an organic acid, such as oxalic acid, or an inorganic acid, such as hydrochloride or nitric acid. Preferably, the acid is an organic acid selected from the group consisting of acetic acid, citric acid, and oxalic acid, and is most preferably oxalic acid. Mixing of the mazzite zeolite with the aqueous solution of acid may occur under continuous stir conditions at a temperature ranging from 0° C. to 200° C., most preferably from 25° C. to 75° C., for a period of ranging from 4 hours to 48 hours, most preferably from 8 hours to 30 hours. The dealuminated zeolitic product may be decanted, washed in water, and dried in air at a temperature ranging from 60° C. to 300° C., preferably from 100° C. to 150° C., for a period ranging from 4 hours to 48 hours, preferably from 8 hours to 24 hours. The dealuminated mazzite zeolite product should have a $SiO_2$ to $Al_2O_3$ ratio greater than 150% of the original $SiO_2$ to $Al_2O_3$ ratio.

The mazzite zeolite is then physically mixed with an inorganic binder and a peptizing agent. In a preferred embodiment, the mazzite zeolite is physically mixed with chromic oxide, and inorganic binder and a peptizing agent in order to form a mixture which contains chromic oxide. The resulting mixture should have a consistency and texture suitable for shaping by extrusion, pelletizing, tableting or other suitable means. If chromic oxide is used, it may be in any physical form which allows for a final mixture of consistency and texture suitable for shaping by extrusion, pelletizing, tableting or other means, and is preferably a fine powder. The amount of chromic oxide may range from 5% to 100% by weight of the mazzite zeolite, preferably from about 10% to about 60% by weight. The inorganic binder is preferably selected from the group consisting of alumina, silica, alumina-silica, aluminum phosphate, clays, and mixtures thereof, and is most preferably alumina. The amount of inorganic binder ranges from 20% to 120% by weight of the mazzite zeolite, preferably from about 40% to about 100% by weight. The peptizing agent can be any composition suitable for aiding in the creation of a mixture having a consistency and texture suitable for shaping, and is preferably a weak (less than about 30% by weight) aqueous solution of an organic acid, most preferably an aqueous solution of about 5% to about 15% by weight acetic acid. The amount of peptizing agent ranges from 0% to 240% by weight of the mazzite zeolite, preferably from about 50% to about 180% by weight. The mazzite zeolite, chromic oxide, inorganic binder, and peptizing agent may be mixed continuously at a temperature ranging from 0° C. to 100° C., preferably from 10° C. to 40° C., for a period ranging from 1 hour to 48 hours, preferably from 4 hours to 16 hours. The mixture may be shaped by extrusion, pelletizing, tableting, or other suitable means into individual pieces with surface areas generally ranging from about 50 $m^2$/g to about 700 $m^2$/g.

The mazzite zeolite is then subjected to a calcining step whereby it is exposed, by any suitable method known in the art, to a gas atmosphere under temperature and pressure conditions and for a period of time that suitably provides a calcined material. Such calcination drives off any combustible contaminants and water that may be present in the pores of the mazzite zeolite. The gas used in the calcination of the mazzite zeolite can be selected from the group consisting of inert gasses (for example, nitrogen, helium, and argon gasses), reducing gases (for example, carbon monoxide and hydrogen gases), air, oxygen, and steam, preferably the gas is selected from the group consisting of air, oxygen, nitrogen, and mixtures of one or two thereof. The calcining temperature is generally in the range from about 100° C. to 1000° C., and preferably from about 500° C. to 600° C. Generally, the calcination may be conducted at a pressure from below atmospheric upwardly to about 1000 psia, preferably from or about atmospheric to or about 100 psia. The time period for conducting the calcining step must be sufficient to purge the nitrogen and provide a hard material which is substantially dry, i.e., free of water. Generally, the period for exposing the mazzite zeolite to the atmosphere at appropriate temperature conditions ranges from about 0.1 hour to about 30 hours, preferably from about 1 hour to about 10 hours.

The modified mazzite zeolite is then impregnate with a metal from the group consisting of chromium, molybdenum, tungsten, oxides of these metals, and mixtures of these metals and metal oxides. Preferably, the metal is chromium or an oxide of chromium and most preferably the metal is chromium. Impregnation may be accomplished by any suitable means known in the art, a preferred method of impregnation being the incipient wetness method. Using conventional incipient wetness techniques, a determination may be made as to the amount of water required to saturate and fill the pores of the modified mazzite zeolite support. An aqueous solution may then be prepared utilizing the predetermined amount of water and a sufficient amount of a precursor of chromium, molybdenum, tungsten and/or oxides of these metals (e.g., chromium nitrate, ammonium metatungstate, and ammonium molybdenite) to provide a catalyst having the desired concentration of the selected metal(s). The aqueous solution may then be incrementally added to the modified mazzite zeolite until its outer surface appears saturated, where upon addition of the aqueous solution is halted. The impregnated mazzite zeolite may then be subjected to a calcining step whereby it is exposed, by any suitable method known in the art, to a gas atmosphere under temperature and pressure conditions and for a period of time that suitably provides a calcined material. The gas used in the calcination of the mazzite zeolite can be selected from the group consisting of inert gasses (for example, nitrogen, helium, and argon gasses), reducing gases (for example, carbon monoxide and hydrogen gases), air, oxygen, and steam, preferably the gas is selected from the group consisting of air, oxygen, nitrogen, and mixtures of one or two thereof. The calcining temperature is generally in the range from about 100° C. to 1000° C., and preferably from about 500° C. to 600° C. Generally, the calcination may be conducted at a pressure from below atmospheric upwardly to about 1000 psia, preferably from or about atmospheric to or about 100 psia. The time period for conducting the calcining step must be sufficient to purge the nitrogen and provide a hard material which is substantially dry, i.e., free of water. Generally, the period for exposing the mazzite zeolite to the atmosphere at appropriate temperature conditions ranges from about 0.1 hour to about 30 hours, preferably from about 1 hour to about 10 hours. The resulting novel composition is an impregnated modified mazzite supported catalyst.

The impregnated modified mazzite supported catalyst may be used in a novel process for dehydrogenating hydrocarbons. The dehydrogenation process of the present invention can begin with a hydrocarbon feedstock preheating step. The feedstock can be preheated in feed/reactor effluent heat exchangers prior to entering a furnace or contacting other high temperature waste heat means for final preheating to a targeted catalytic reaction zone inlet temperature. Suitable final preheating means can include, but are not limited to waste heat from other refinery processes such as a fluid catalytic cracking unit, a fluidized or delayed coking unit, a catalytic hydrocracker, a crude distillation unit, a catalytic reforming unit, and/or hydrotreating units found in conventional petroleum refineries.

The feedstock can be contacted with a hydrogen stream prior to, during, and/or after preheating, before the catalytic dehydrogenation reaction zone, in any one or more of the reactors in the reaction zone, or between reactors in a multiple reactor reaction zone. The hydrogen diluent stream can be pure hydrogen or can be an admixture with diluents such as low-boiling hydrocarbons, carbon monoxide, carbon dioxide, nitrogen, water, sulfur compounds, and the like. The hydrogen stream purity should be at least about 50% by volume hydrogen, preferably at least about 65% by volume hydrogen, and more preferably at least 75% by volume hydrogen for best results.

The reaction zone can include, but is not limited to, one or more fixed bed reactors, a moving column reactor, or a fluidized bed reactor. The preferred reaction zone facilities for use with the dehydrogenation process of the present invention are fixed bed reactors. If a fixed bed reactor is used, catalyst pellets, typically mixed with a catalytic inert filler material (i.e., alumina), are positioned in the reactor to form a fixed catalyst bed. Any spaces in the reactor not occupied by the catalyst bed are filled with filler material. The feedstock may be contacted with a catalyst or a catalyst bed in either upward, downward, or radial flow fashion with downflow being preferred. The reactants may be in the liquid phase, admixed liquid and vapor phase, or the vapor phase, with the best results obtained in the vapor phase.

Operating conditions to be used in the dehydrogenation process of the present invention include an average catalytic reaction zone temperature from about 250° C to about 800° C., preferably from about 375° C. to about 675° C., and more preferably from 500° C. to 600° C. for best results. Reaction temperatures below these ranges can result in reduced paraffin conversion and lower olefin yield. Reaction temperatures above these ranges can result in reduced olefin selectivity and lower olefin yields.

The process of the present invention generally operates at catalytic reaction zone pressures ranging from as low as substantially vacuum pressure (about 0 to about 27.6 inches of water vacuum) to about 500 psig, preferably from substantially vacuum pressure to about 300 psig, and more preferably from substantially vacuum pressure to 100 psig for best results. Where the process operates in the presence of hydrogen, hydrogen circulation rates generally range from about 1 SCF/Bbl (standard cubic feet per barrel) to about 12,000 SCF/Bbl, preferably from about 1 SCF/Bbl to about 6,000 SCF/Bbl, and most preferably from 1 SCF/Bbl to 1000 SCF/Bbl for best results. Hydrogen circulation rates below these ranges can result in higher catalyst deactivation rates resulting in increases energy intensive regeneration cycles. Excessively high reaction pressures increase energy and equipment costs and provide diminishing marginal benefits. Excessively high hydrogen circulation rates can also influence reaction equilibrium and drive the reaction undesirably toward reduced paraffin conversion and lower olefin yield.

The process of the present invention generally operates at a weight hourly space velocity (WHSV) for the paraffin (in units of grams of paraffin/gram of catalyst/hour) from about 0.1 to about 100, preferably from about 0.5 to about 40, and most preferably from 2 to 20 for best results. Feed space velocities exceeding the level described herein generally result in a declined in paraffin conversion which overwhelm any gain in olefin selectivity, thereby resulting in lower olefin yield. Feed space velocities short of the level described herein are generally costly in terms of capital requirements.

Since the dehydrogenation reaction is generally endothermic, interstage heating, consisting of heat transfer devices between fixed bed reactors or between catalyst beds in the same reactor shell, can be employed. Heat sources can include conventional process heaters such as one or more process furnaces or can include internally produced heat such as that produced from catalyst regeneration within a fluidized catalytic process. Heating requirements may also be met from heating sources available from other refiner process units such as from a fluid catalytic cracking process or a fluidized coker.

The dehydrogenation reaction zone effluent is generally cooled and the effluent stream is directed to a separator device such as a stripper tower where light hydrocarbons and hydrogen formed during the reaction step can be removed and directed to more appropriate hydrocarbon pools. Where the process is performed in the presence of supplemental hydrogen or sufficient internally generated hydrogen is produced, a separate hydrogen separation step can be performed upstream of and prior to light hydrocarbon separation. Some of the recovered hydrogen can be recycled back to the process while some of the hydrogen can be purged to external systems such as plant or refinery fuel. Recycled hydrogen can be compressed, supplemented with "make-up" hydrogen, and reinjected into the process for further dehydrogenation where supplemental hydrogen is added.

Periodic catalyst regeneration may be required depending on the severity of operation and other process parameters. It is anticipated that the catalyst utilized in the process of the present invention will require regeneration about once every 6 months, but may require regeneration as often as 3 or 4 times every month. The catalyst of the present invention is particularly suited for regeneration by the oxidation or burning of catalyst deactivating carbonaceous deposits with oxygen or an oxygen-containing gas. The term "regeneration," for purposes of the present invention, shall mean the recovery of at least a portion of the initial catalytic activity by combusting the coke deposits on the catalyst with oxygen or an oxygen-containing gas.

The prior art is replete with catalyst regeneration techniques that may be employed in the process of the present invention. For example, U.S. Pat. No. 2,391,327 discloses the regeneration of catalysts contaminated with carbonaceous deposits with a cyclic flow of regeneration gases. U.S. Pat. No. 4,480,144 relates to the use of circulating gas to regenerate a coke deactivated zeolite-contained catalyst.

The circulating gas is maintained at a low moisture level by purging wet gases from the loop while simultaneously introducing dry gases into the loop. This method is particularly useful with zeolitic catalysts since zeolitic catalysts can be detrimentally effected by the presence of water.

In order to more clearly illustrate the present invention, examples and data have been provided below. The following examples are included for the purpose of illustration and should not be construed as limiting the scope of the present invention.

EXAMPLES

The following examples, more clearly illustrate the catalyst of the present invention and comparable catalysts. Each catalyst was tested for its effectiveness in the dehydrogenation of propane into propylene by contacting the catalyst with at least 99% pure propane in a dehydrogenation process as described above, under the following conditions:

Temperature: 545° C.–555° C.
Pressure: ≅1 atmosphere
Propane Feed Rate: 5.5 L/hr–7.0 L/hr
Weight Hourly Space Velocity (WHSV): 2.5 $hr^{-1}$–6.0 $hr^{-1}$
Diluent: Hydrogen (Catalyst 8 used steam)
Diluent Feed Rate: 5.50 L/hr–6.5 L/hr Test results were evaluated in terms of propane conversion and propylene selectivity. Table 1 provides a summary of test results for the catalysts whose preparations are illustrated by the following examples.

Example 1

A catalyst in accordance with the present invention was prepared by modifying the commercially available omega mazzite zeolite "Ω-5" (provided by Universal Oil Products, Des Plaines, Ill.) and impregnating it with chromium.

A 150 gram sample of zeolite Ω-5 powder was ion-exchanged by twice combining it with 1300 ml of a 1.0 molar aqueous solution of ammonium nitrate, continuously stirring the mixture for 16 hours at 90° C., then decanting. After being twice ion-exchanged, the zeolitic product was washed with water and dried in air at a temperature of 125° C. for 16 hours. 10 grams of the ion-exchanged mazzite zeolite was acid leached by mixing it with 300 milliliters of 1.0 molar oxalic acid and continuously stirring the mixture for 20 hours at 50° C. The dealuminated product was washed with water and dried in air at 125° C. for 16 hours. The ion-exchanged and dealuminated mazzite zeolite was physicallymixed with 3 grams of chromic oxide, 10 grams of Catalpal D alumina binder, and 8 grams of an aqueous solution of 10% by weight acetic acid (a peptizing agent). The combination was continuously mixed at room temperature for 8 hours, extruded into 1/16" extrudate, and calcined in air at a temperature of 538° C. for 6 hours. 3 grams of the modified mazzite zeolite extrudate was impregnated with chromium by contacting its outer surface with 2.00 grams of a 50% by weight chromium nitrate aqueous solution using the incipient wetness method. The wetted extrudate was calcined in air at 538° C. for 6 hours. The resulting catalyst contained 4.06% by weight of elemental chromium. The catalyst was designated as Catalyst 1.

Example 2

A catalyst comparable to Catalyst 1 was prepared using methods similar to those of Catalyst 1, however the preparation did not include a step for physically mixing the mazzite zeolite with chromic oxide.

The Ω-5 mazzite zeolite was first modified by subjecting it to an ion-exchange in accordance with Catalyst 1 methods. The ion-exchanged mazzite zeolite was then dealuminated with oxalic acid in accordance with Catalyst 1 methods. The ion-exchanged and dealuminated mazzite zeolite was physically mixed with 10 grams of Catalpal D alumina binder and 7 grams of an aqueous solution of 10% by weight acetic acid (a peptizing agent). The combination was continuously mixed at room temperature for 8 hours, extruded into 1/16" extrudate, and calcined in air at a temperature of 538° C. for 6 hours. 3 grams of the modified mazzite zeolite extrudate was impregnated with chromium by contacting its outer surface with 1.67 grams of a 50% by weight chromium nitrate aqueous solution using the incipient wetness method. The wetted extrudate was calcined in air at 538° C. for 6 hours. The resulting catalyst contained 3.44% by weight of elemental chromium. The catalyst was designated as Catalyst 2.

Example 3

A catalyst comparable to Catalyst 1 was prepared using methods similar to those of Catalyst 1, however the preparation involved a step for dealumination using nitric acid rather than oxalic acid and the preparation did not include a step for, physically mixing the mazzite zeolite with chromic oxide.

The Ω-5 mazzite zeolite was first modified by subjecting it to an ion-exchange in accordance with Catalyst 1 methods. 10 grams of the ion-exchanged mazzite zeolite was acid leached by mixing it 300 grams of 1.0 molar nitric acid and continuously stirring the mixture for 20 hours at 90° C. The dealuminated zeolitic product was washed with water and dried in air at 125° C. for 16 hours. The ion-exchanged and dealuminated mazzite zeolite was physically mixed with a 10 grams of Catalpal D alumina binder and 7 grams of an aqueous solution of 10% by weight acetic acid (a peptizing agent). The combination was continuously mixed at room temperature for 8 hours, extruded into 1/16" extrudate, and calcined in air at a temperature of 538° C. for 6 hours. 3 grams of the modified mazzite zeolite extrudate was impregnated with chromium by contacting its outside surface with 2.01 grams of a 50% by weight chromium nitrate aqueous solution using the incipient wetness method. The wetted extrudate was calcined at 538° C. for 6. The resulting catalyst contained 4.17% by weight of elemental chromium. The catalyst was designated as Catalyst 3.

Example 4

A catalyst comparable to Catalyst 1 was prepared using methods similar to those of Catalyst 1, however the preparation did not include a step for dealumination with oxalic acid.

The Ω-5 mazzite zeolite was first modified by subjecting it to an ion-exchange in accordance with Catalyst 1 methods. 10 grams of the ion-exchanged mazzite zeolite was physically mixed with 3 grams of chromic oxide, 6 grams of Catalpal D alumina binder, and 8 grams of an aqueous solution of 10% by weight acetic acid (a peptizing agent). The combination was continuously mixed at room temperature for 8 hours, extruded into 1/16" extrudate, and calcined in air at a temperature of 538° C. for 6 hours. 3 grams of the modified mazzite zeolite extrudate was impregnated with chromium by contacting its outer surface with 2.06 grams of a 50% by weight chromium nitrate aqueous solution using the incipient wetness method. The wetted extrudate was calcined in air at 538° C. for 6 hours. The resulting catalyst contained 4.16% by weight of elemental chromium. The catalyst was designated as Catalyst 4.

Example 5

A catalyst comparable to Catalyst 1 was prepared using methods similar to those of Catalyst 1, however the preparation did not include a step for dealumination with oxalic acid nor did it include a step for physically mixing the mazzite zeolite with chromic oxide.

The Ω-5 mazzite zeolite was first modified by subjecting it to an ion-exchange in accordance with Catalyst 1 methods. 10 grams of the ion-exchanged mazzite zeolite was physically mixed with 10 grams of Catalpal D alumina binder and 20 grams of an aqueous solution of 10% by weight acetic acid (a peptizing agent). The combination was continuously mixed at room temperature for 8 hours, extruded into 1/16" extrudate, and calcined in air at a temperature of 538° C. for 6 hours. 3 grams of the modified mazzite zeolite extrudate was impregnated with chromium by contacting its outer surface with 2.03 grams of a 50% by weight chromium nitrate aqueous solution using the incipient wetness method. The wetted extrudate was calcined at 538° C. for 6 hours. The resulting catalyst contained 4.34% by weight of elemental chromium. The catalyst was designated as Catalyst 5.

Example 6

A catalyst comparable to Catalyst 1 was prepared using methods similar to those of Catalyst 1, however the preparation included a step for ion-exchanging with potassium nitrate rather than ammonium nitrate and did not include a step for dealumination nor a step for physically mixing the mazzite zeolite with chromic oxide.

A 10 gram sample of zeolite Ω-5 powder was ion-exchanged by combining it with 300 ml of a 1.0 molar aqueous solution of potassium nitrate, continuously stirring the mixture for 64 hours at 90° C. After being ion-exchanged the zeolitic product was decanted, washed with water, and dried in air at a temperature of 125° C. for 16 hours. The ion-exchanged mazzite zeolite was physically mixed with 10 grams of Catalpal D alumina binder and 17 grams of an aqueous solution of 10% by weight acetic acid (a peptizing agent). The combination was continuously mixed at room temperature for 8 hours, extruded into 1/16" extrudate, and calcined in air at a temperature of 538° C. for 6 hours. 3 grams of the modified mazzite zeolite extrudate then impregnated with chromium by contacting its outer surface with 3.88 grams of a 25% by weight chromium nitrate aqueous solution using the incipient wetness method. The wetted extrudate was calcined at 538° C. for 6 hours. The resulting catalyst contained 4.03% by weight of elemental chromium. The catalyst was designated as Catalyst 6.

Example 7

A catalyst comparable to Catalyst 1 was prepared using methods similar to those of Catalyst 1, however the preparation did not include a step for dealumination with oxalic acid nor did it include a step for impregnation with chromium.

The Ω-5 mazzite zeolite was first modified by subjecting it to an ion-exchange in accordance with Catalyst 1 methods. 10 grams of the ion-exchanged mazzite zeolite was physically mixed with 3 grams of chromic oxide, 6 grams of Catalpal D alumina binder, and 8 grams of an aqueous solution of 10% by weight acetic acid (a peptizing agent). The combination was continuously mixed at room temperature for 8 hours, extruded into 1/16" extrudate, and calcined in air at a temperature of 538° C. for 6 hours. The catalyst was designated Catalyst 7.

CONTROL

A comparison catalyst which is the commercially available STAR catalyst (Phillips Petroleum Company, Bartlesville, Okla.). The Phillips STAR catalyst is a promoted, noble metal catalyst utilizing a zinc aluminate spinel as the catalyst support. The catalyst was designated as Catalyst 8.

TABLE 1

| Catalyst Number | Zeolitic Carrier | Ion-Exchange Aqueous Sol. | Dealum. Acid | Impreg. Metal | Propane Conversion | Propylene Selectivity |
|---|---|---|---|---|---|---|
| 1 | $Cr_2O_3$/Mazzite | $NH_4NO_3$ | Oxalic | Cr | 12.66 | .96 |
| 2 | Mazzite | $NH_4NO_3$ | Oxalic | Cr | 10.08 | .90 |
| 3 | Mazzite | $NH_4NO_3$ | Nitric | Cr | 8.50 | .90 |
| 4 | $Cr_2O_3$/Mazzite | $NH_4NO_3$ | — | Cr | 8.06 | .95 |
| 5 | Mazzite | $NH_4NO_3$ | — | Cr | 8.27 | .83 |
| 6 | Mazzite | $KNO_3$ | — | Cr | 7.31 | .83 |
| 7 | $Cr_2O_3$/Mazzite | $NH_4NO_3$ | — | — | 4.54 | .82 |
| 8 | ----------Commercial STAR Catalyst---------- | | | | 3.49 | .97 |

Catalysts 1–7 are all embodiments of the present invention, with Catalyst 1 being the preferred embodiment. As illustrated in Table 1, Catalysts 1–7 provide higher propane conversion rates than commercial Catalyst 8. Catalyst 1 produces propane conversion and propylene selectivity results which are superior to similarly prepared Catalysts 2–7. In comparison with commercial Catalyst 8, Catalyst 1 produces propane conversion results which are far superior to commercial Catalyst 8 and propylene selectivity results which are substantially the same as that of Catalyst 8.

The present invention provides a more effective catalyst for the dehydrogenation of hydrocarbons in that the catalyst of the present invention provides superior levels of paraffin conversion and olefin selectivity. In situations where the hydrocarbon feed contains a considerable amount of sulfur, the present invention is especially valuable because the metal or metals impregnated into the catalyst (chromium, molybdenum, and/or tungsten) are recognized for their resistance to sulfur poisoning.

The present invention provides a more economical catalyst in that it uses hydrogen rather than steam as a diluent. Typically, a considerable amount of hydrogen already exists in the hydrocarbon feedstream. It is much less expensive to take advantage of the existing hydrogen, along with supplemental hydrogen if needed, as a diluent rather than to supply steam from an outside source as a diluent.

Obviously, many modifications and variations of the present invention are possible in light of the above teachings. It is, therefore, to be understood that within the scope of the appended claims, the invention may be practiced otherwise than as specifically described.

That which is claimed is:

1. A process for hydrocarbon conversion comprising contacting a hydrocarbon feed with a catalst under conditions effective to convert said hydrocarbon feed to a hydrocarbon product different from said hydrocarbon feed, wherein said catalyst comprises a composition formed from calcining a physical blend of chromic oxide, an inorganic binder, a peptizing agent, and a mazzite zeolite, said mazzite zeolite having been modified such that its alkali metal content is less than 0.5% by weight wherein said physical blend is impregnated with at least one metal from the group consisting of chromium, molybdenum, tungsten, and oxides of these metal.

2. A process for hydrocarbon conversion in accordance with claim 1 wherein said metal impregnated into said physical blend is chromium.

3. A process for hydrocarbon conversion in accordance with claim 1 wherein said mazzite zeolite is modified such that its $SiO_2$ to $Al_2O_3$ ratio is at least 150% higher than that of the original mazzite zeolite.

4. A process for hydrocarbon conversion in accordance with claim 3 wherein said metal impregnated into said physical blend is chromium.

5. A process for hydrocarbon conversion in accordance with claim 3 wherein said physical blend which contains said mazzite zeolite, said chromic oxide, said inorganic binder, and said peptizing agent has been calcined and is impregnated with said at least on metal.

6. A process for hydrocarbon conversion in accordance with claim 5 wherein said metal impregnated into the calcined physical blend is chromium.

7. A process for hydrocarbon conversion, said process comprises contacting a hydrocarbon feed under effective hydrocarbon conversion conditions with a catalyst prepared by the process comprising:

(a) modifying a mazzite zeolite by ion-exchanging said mazzite zeolite with an aqueous solution of an ammonium salt, such that the zeolitic product contains less than 0.5% alkali metal by weight;

(b) physically mixing the modified mazzite zeolite with chromic oxide, an inorganic binder, and a peptizing agent, such that the subsequent product is a physical blend have a consistency and texture suitable for shaping into extrudate, pellets or tablets:

(c) shaping said physical blend by extrusion, pelletizing or tableting;

(d) calcining the shaped physical blend such that the product is a modified mazzite zeolite support;

(e) impregnating said modified mazzite zeolite support with at least one metal from the group consisting of chromium, molybdenum, tungsten, and oxides of these metals; and (f) calcining the impregnated modified mazzite zeolite support.

8. A process in accordance with claim 7 wherein chromium is the metal impregnated into said modified mazzite zeolite support.

9. A process for hydrocarbon conversion, said process comprises contacting a hydrocarbon feed under effective hydrocarbon conversion conditions with a catalyst prepared by the process comprising:

(a) a modifying mazzite zeolite by ion-exchanging said mazzite zeolite with an aqueous solution of an ammonium salt, such that the zeolitic product contains less than 0.5% alkali metal by weight;

(b) modifying said mazzite zeolite by dealumination with an organic acid, such that the zeolitic product has a $SiO_2$ to $Al_2O$ ratio at least 150% higher than that of the unmodified original mazzite zeolite;

(c) physically mixing the modified mazzite zeolite with chromic oxide an inorganic binder, and a peptizing agent, such that the subsequent product is a physical blend having a consistency and texture suitable for shaping into extrudate, pellets or tablets;

(d) shaping said physical blend by extrusion, palletizing or tableting, (e) calcining the shaped physical blend, such that the product is a modified zeolite support;

(f) impregnating said modified mazzite zeolite support with at least one metal selected from the group consisting of chromium, molybdenum, tungsten, and oxides of these metals; and (g) calcining the impregnated modified mazzite zeolite support.

10. A process in accordance with claim 9 wherein said organic acid is oxalic acid.

11. A process in accordance with claim 9 wherein chromium is the metal inpregnated into sad modified mazzite zeolite support.

12. A process in accordance with claim 11 wherein said ammonium salt is ammonium nitrate, said inorganic binder is an alumina binder, said peptizing agent is an aqueous solution of acetic acid, and said acid is oxalic acid.

* * * * *